(12) United States Patent
Lin et al.

(10) Patent No.: US 12,470,158 B2
(45) Date of Patent: Nov. 11, 2025

(54) MOTOR SYSTEM OF ACCURATE BACK-ELECTROMOTIVE FORCE DETECTION AND OPERATION METHOD THEREOF

(71) Applicant: Artery Technology Company, Hsinchu (TW)

(72) Inventors: Ming-Tsan Lin, Keelung (TW); Zi-Xuan Huang, Nantou County (TW); Yi-Shiang Ouyang, Miaoli County (TW)

(73) Assignee: ARTERY TECHNOLOGY COMPANY, Hsinchu (TW)

( * ) Notice: Subject to any disclaimer, the term of this patent is extended or adjusted under 35 U.S.C. 154(b) by 163 days.

(21) Appl. No.: 18/595,450

(22) Filed: Mar. 5, 2024

(65) Prior Publication Data

US 2025/0125748 A1    Apr. 17, 2025

(30) Foreign Application Priority Data

Oct. 13, 2023    (CN) .......................... 202311325528.1

(51) Int. Cl.
| | |
|---|---|
| *H02P 6/182* | (2016.01) |
| *H02K 11/00* | (2016.01) |
| *H02K 11/33* | (2016.01) |
| *H02P 6/15* | (2016.01) |

(52) U.S. Cl.
CPC .......... *H02P 6/182* (2013.01); *H02K 11/0094* (2013.01); *H02K 11/33* (2016.01); *H02P 6/157* (2016.02); *H02P 2207/05* (2013.01)

(58) Field of Classification Search
CPC .......... H02P 6/157; H02P 6/187; H02P 6/182; H02P 2207/05; H02K 11/33; H02K 11/0094
USPC ...................................... 318/400.34
See application file for complete search history.

(56) References Cited

U.S. PATENT DOCUMENTS

| | | | | |
|---|---|---|---|---|
| 10,622,926 | B1 * | 4/2020 | Yao | .......................... H02P 25/03 |
| 2004/0135530 | A1 * | 7/2004 | Liu | ............................ H02P 6/16 |
| | | | | 318/400.34 |
| 2005/0237017 | A1 * | 10/2005 | Biamonte | ............... H02P 6/185 |
| | | | | 318/400.35 |
| 2006/0197482 | A1 * | 9/2006 | Harwood | ................ H02P 6/182 |
| | | | | 318/432 |

(Continued)

*Primary Examiner* — Gabriel Agared
(74) *Attorney, Agent, or Firm* — WPAT, P.C.; Anthony King (57) ABSTRACT

A motor system includes a brushless direct current motor, voltage divider circuits, a switch and an analog-to-digital converter. The brushless direct current motor includes 3 sets of windings, one set of windings being floating during each commutation. There are 3 voltage divider circuits, and each voltage divider circuit includes a first resistor, a second resistor and a bypass diode. The first resistor includes a first terminal coupled to the set of floating windings. The second resistor includes a first terminal coupled to the first resistor, and a second terminal coupled to the switch to receive a control voltage at the second terminal of the second terminal or grounding the second terminal of the second terminal. The bypass diode is coupled in parallel to the first resistor. The analog-to-digital converter receives a divided back-electromotive force signal to determine back-electromotive force zero crossing, so as to perform the commutation.

16 Claims, 8 Drawing Sheets

(56) References Cited

U.S. PATENT DOCUMENTS

2016/0079893 A1\* 3/2016 Pietromonaco ........... H02P 6/14
 318/254.1
2016/0181957 A1\* 6/2016 Sun ........................ H02P 6/182
 318/400.27
2023/0283210 A1\* 9/2023 Price ................... H02M 7/5387
 318/400.34

\* cited by examiner

MOTOR SYSTEM OF ACCURATE BACK-ELECTROMOTIVE FORCE DETECTION AND OPERATION METHOD THEREOF

BACKGROUND OF THE INVENTION

1. Field of the Invention

The invention relates to electronic devices, and in particular, to a motor system of accurate back-electromotive force detection and an operation method thereof.

2. Description of the Prior Art

Brushless direct current (BLDC) motors are used in a wide range of applications including robots, computer equipment, medical equipment, automotive devices, pump devices, home appliances, and others. Compared to the conventional brushed motors, the BLDC motors has improved efficiency, require less maintenance (no carbon brush and commutator wearing problems), and may achieve a flat torque curve across all rated speeds.

The common BLDC motors employ a three-phase configuration. Since the rotor of the BLDC motor is driven by the rotating magnetic field of the stator winding, the position of the rotor must be tracked to effectively drive the rotor. The motor system may track the rotor position according to the back-electromotive force (back-EMF) zero crossing point of the BLDC motor. However, the related art cannot accurately detect the back-EMF zero crossing point when the back-EMF voltage is close to zero.

SUMMARY OF THE INVENTION

According to an embodiment of the invention, a motor system includes a brushless direct current (BLDC) motor, a driving circuit, a voltage divider circuit, and an analog-to-digital converter (ADC). The BLDC motor includes a first winding, a second winding, and a third winding. The first winding, the second winding and the third winding are tied together at a neutral node. The driving circuit includes a first set of switches, a second set of switches, and a third set of switches. There are three half-bridge structure switch sets in the driving circuit. The first set of switches is coupled to the first winding, and is used to output a pulse width modulation (PWM) driving signal to the first winding. The second set of switches is coupled to the second winding, and is used to couple the second winding to a ground terminal. The third set of switches is coupled to the third winding, and is used to float the third winding. The voltage divider circuit includes a first resistor, a second resistor, and a bypass diode. The first resistor includes a first terminal coupled to the third winding, and a second terminal. The second resistor includes a first terminal coupled to the second terminal of the first resistor, and a second terminal configured to optionally connect to a control voltage or ground via a switch. The bypass diode is in parallel with the first resistor. The ADC is coupled to the voltage divider circuit and is used to receive the processed back-EMF feedback signal from the second terminal of the first resistor. According to the back-EMF feedback signal, the zero crossing point of the back-EMF could be determined.

According to another embodiment of the invention, a motor system includes a BLDC motor, a driving circuit, a voltage divider circuit, and an ADC. The BLDC motor includes a first winding, a second winding, and a third winding. The first winding, the second winding and the third winding are coupled to each other at a neutral node. The driving circuit includes a first set of switches, a second set of switches, and a third set of switches. The first set of switches is coupled to the first winding, and is used to output a pulse width modulation driving signal to the first winding. The second set of switches is coupled to the second winding, and is used to couple the second winding to a ground terminal. The third set of switches is coupled to the third winding, and is used to float the third winding. The voltage divider circuit includes a first resistor, a second resistor, and a bypass diode. The first resistor includes a first terminal coupled to the third winding, and a second terminal. The second resistor includes a first terminal coupled to the second terminal of the first resistor, and a second terminal configured to optionally connect to a control voltage or a ground via a switch. The bypass diode includes a first terminal coupled to the first terminal of the first resistor, and a second terminal coupled to the second terminal of the first resistor. The ADC is coupled to the voltage divider circuit and is used receiving the processed back-EMF feedback signal from the second terminal of the first resistor. According to the back-EMF feedback signal, the zero crossing point of the back-EMF could be determined.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
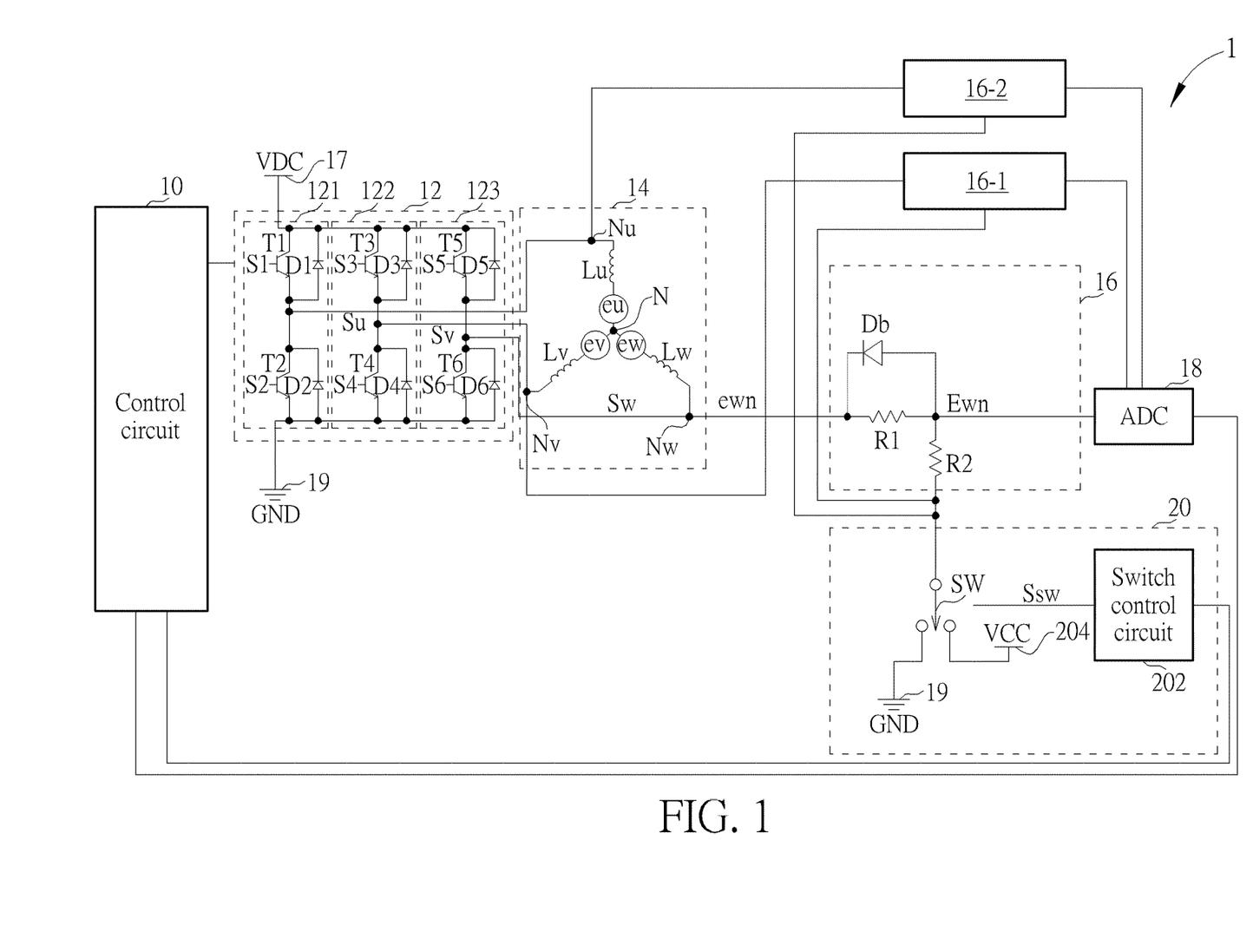
FIG. 1 is a schematic diagram of a motor system according to an embodiment of the invention.

FIG. 1 is a schematic diagram of a motor system 1 according to an embodiment of the invention. The motor system 1 may include a control circuit 10, a driving circuit 12, a brushless direct current (BLDC) motor 14, voltage divider circuits 16, 16-1 and 16-2, an analog-to-digital converter (ADC) 18, and a switch circuit 20. The control circuit 10 may be coupled to the driving circuit 12, the driving circuit 12 may be coupled to the BLDC motor 14, the BLDC motor 14 may be coupled to the voltage divider circuits 16, 16-1 and 16-2, and the voltage divider circuit 16 may be coupled to the ADC 18 and the switch circuit 20.

The BLDC motor 14 may include a rotor and a stator and may be operated in three phases (U phase, V phase, and W phase). The rotor may be equipped with a permanent magnet and may be spaced apart from the stator to rotate or translate. The stator may include a yoke and windings Lu, Lv, and Lw. The yoke may be cylindrical in shape and may be arranged around the rotor. The windings Lu, Lv and Lw may be distributed over the yoke, and the windings Lu, Lv and Lw may be coupled to each other at a neutral node N. Specifically, the winding Lu may include a first terminal, and a second terminal coupled to the neutral node N. Similarly, the winding Lv may include a first terminal, and a second terminal coupled to the neutral node N. The winding Lw may include a first terminal, and a second terminal coupled to the neutral node N.

The voltage divider circuit 16 may be coupled to the first terminal of the winding Lw. While the embodiment in FIG. 1 only shows that the voltage divider circuit 16 is coupled to the ADC 18, the invention is not limited thereto. In some embodiments, the three voltage divider circuits 16, 16-1 and 16-2 of the motor system 1 may be respectively coupled to the first terminal of the winding Lw, the first terminal of the winding Lv and the first terminal of the winding Lu. Further, the three voltage divider circuits 16, 16-1 and 16-2 may be coupled to the ADC 18 and respective switch circuits. In other embodiments, the motor system 1 may further include a multiplexer, and the first terminal of the winding Lu, the first terminal of the winding Lv, and the first terminal of the winding Lw may be coupled to the voltage divider circuit 16 via the multiplexer.

The driving circuit 12 may excite two of the windings Lu, Lv and Lw at any time in a predetermined order to form a rotating magnetic field, thereby driving the rotor to rotate. When the rotor rotates, the windings Lu, Lv and Lw may generate back electromotive forces (back-EMF) eu, ev and ew, respectively. Switching the directions of the currents in the windings in the predetermined order to maintain a constant direction of the rotating magnetic field and keep the rotor rotating or translating smoothly is referred to as commutation. The ADC 18 may detect back-EMF zero crossing points of the back-EMFs eu, ev and ew, and the control circuit 10 may determine the timing for commutation according to the back-EMF zero crossing points. The motor system 1 may accurately detect the back-EMF zero crossing points without adopting extra sensors or the neutral node.

The driving circuit 12 may include a first set of switches 121 coupled to the winding Lu; a second set of switches 122 coupled to the winding Lv; and a third set of switches 123 coupled to the winding Lw. Specifically, the first set of switches 121 may include an high-side switch T1 and a low-side switch T2, the second set of switches 122 may include an high-side switch T3 and a low-side switch T4, and the third set of switches 123 may include an high-side switch T5 and a low-side switch T6. The switches T1 to T6 may be, but are not limited to, NPN-type bipolar junction transistors (BJTs). In some embodiments, the transistors T1 to T6 may be P-type transistors or other N-type transistors such as N-type metal-oxide-semiconductor field-effect transistors (MOSFETs). The high-side switch T1 includes a control terminal coupled to the control circuit 10, a first terminal coupled to a supply terminal 17, and a second terminal. The low-side switch T2 includes a control terminal coupled to the control circuit 10, a first terminal coupled to the second terminal of the high-side switch T1, and a second terminal coupled to a ground terminal 19. The high-side switch T3 includes a control terminal coupled to the control circuit 10, a first terminal coupled to the supply terminal 17, and a second terminal. The low-side switch T4 includes a control terminal coupled to the control circuit 10, a first terminal coupled to the second terminal of the high-side switch T3, and a second terminal coupled to the ground terminal 19. The high-side switch T5 includes a control terminal coupled to the control circuit 10, a first terminal coupled to the supply terminal 17, and a second terminal. The low-side switch T6 includes a control terminal coupled to the control circuit 10, a first terminal coupled to the second terminal of the high-side switch T5, and a second terminal coupled to the ground terminal 19. The supply terminal 17 may provide a direct current (DC) voltage VDC such as 24V, and the ground terminal 19 may provide a ground voltage GND such as 0V. The transistors T1 to T6 may have body diodes D1 to D6, respectively.

The control circuit 10 may include a microcontroller, a microprocessor, a field programmable gate array (FPGA), or other types of control circuits. The control circuit 10 may generate control signals S1 to S6 to respectively control the switches T1 to T6, so as to generate driving voltages Su, Sv and Sw to control excitation of the windings Lu, Lv and Lw, respectively. When the motor system 1 is in operation, the driving circuit 12 may energize two of the windings Lu, Lv and Lw and float the remaining one of the windings Lu, Lv and Lw at any time, so as to drive the rotor to rotate. For example, the control circuit 10 may generate a pulse width modulation (PWM) control signal S1 and a logic LOW control signal S2 to enable the first set of switches 121 to output a PWM driving voltage Su to the winding Lu, generate a logic LOW control signal S3 and a logic HIGH control signal S4 to enable the second set of switches 122 to couple the winding Lv to the ground terminal 19 to excite the winding Lu and the winding Lv, and generate a logic LOW control signal S5 and a logic LOW control signal S6 to turn off the third set of switches 123 to float the winding Lw.

Since the winding Lw is floating, the voltage ewn at the first terminal (node Nw) of the winding Lw may directly reflect the change of the back-EMF ew. However, since the neutral signal N is influenced by the PWM ON state and the PWM OFF state of the driving voltage Su, the back-EMF signal ewn also exhibits two different states corresponding to the PWM ON time and the PWM OFF time. During the PWM OFF time, the back-EMF voltage ewn at the node Nw could be expressed by Equation (1):

$$ewn = 1.5\,ew \qquad \text{Equation (1)}$$

During the PWM ON time, the back-EMF voltage ewn at the node Nw could be expressed by Equation (2):

$$ewn = 0.5\,VDC + 1.5\,ew \qquad \text{Equation (2)}$$

According to Equations (1) and (2), the voltage ewn could be used to detect the back-EMF zero crossing point. According to Equation (1), during the PWM OFF time, the back-EMF voltage ewn is 0V when the back-EMF zero crossing point (ew-0V) occurs. According to Equation (2), during the PWM ON time, when the back-EMF zero crossing point (ew=0V) occurs, the back-EMF voltage ewn is VDC/2.

However, since the anode voltage of body diode D6 is coupled to the ground GND (0V), during the PWM OFF time, if the voltage ewn at node Nw is less than the barrier voltage of the body diode D6 (e.g., 0.7V), the body diode D6 will be turned on, and the voltage ewn at the node Nw is clamped at −0.7V. The clamping voltage will be divided by the voltage divider circuit 16 to attenuate the back EMF signal Ewn to a smaller value before feeding to the ADC 18. The back EMF signal Ewn is susceptible to noise interference due to its small amplitude, resulting to inaccuracy in determining the back-EMF zero crossing point. For example, during the PWM OFF time, if the voltage ewn is less than −0.7V, the body diode D6 clamps the voltage ewn to the threshold voltage of the body diode (−0.7V), so the circuit cannot sense the changes of the actual back-EMF. After the back-EMF ew is greater than −0.7V, because the voltage ewn is close to zero and the attenuated back EMF signal Ewn is even smaller, it is difficult to detect the back-EMF zero crossing point according to the back EMF signal Ewn.

The voltage divider circuit 16 may be further coupled to the switch circuit 20. The switch circuit 20 may include a switch SW and a switch control circuit 202. The switch SW includes a control terminal coupled to the switch control circuit 202, a first terminal alternatively coupled to the supply terminal 204 or the ground terminal 19, and a second terminal coupled to the second terminal of the second resistor R2. The switch control circuit 202 may be coupled to the control circuit 10.

The voltage divider circuit 16 and the switch circuit 20 may adjust the voltage in the back-EMF signal Ewn during the PWM OFF time to reduce or eliminate the influence of the body diode D6, so that the back-EMF signal Ewn may reflect the actual change of the back-EMF ew in real time to accurately detecting the back-EMF zero crossing point. The voltage divider circuit 16 may include a first resistor R1, a second resistor R2 and a bypass diode Db. The first resistor R1 includes a first terminal coupled to the winding Lw, and a second terminal. The second resistor R2 includes a first terminal coupled to the second terminal of the first resistor R1, and a second terminal configured to alternatively receive the control voltage VCC (e.g., 3.3V) or the ground voltage GND from the switch circuit 20. The bypass diode Db includes a first terminal coupled to the first terminal of the first resistor R1, and a second terminal coupled to the second terminal of the first resistor R1. The first terminal of the bypass diode Db is the cathode, and the second terminal of the bypass diode Db is the anode. The threshold voltage VD of the bypass diode Db may be greater than the threshold voltage VQ of the body diode D6 of the low-side switch T6 in the third set of switches 123. For example, the threshold voltage VD of the bypass diode Db may be 1V, and the threshold voltage VQ of the body diode D6 of the low-side switch T6 may be 0.7V. The ADC 18 may be coupled to the second terminal of the first resistor R1, and may receive the back-EMF signal Ewn from the second terminal of the first resistor R1 to determine the back-EMF zero crossing point for performing commutation. Specifically, upon detection of the back-EMF zero crossing point, the ADC 18 may send a notification message to the control circuit 10 to inform the control circuit 10 to perform commutation. In some embodiments, the ADC 18 may further transmit the back-EMF signal Ewn to the control circuit 10, and the control circuit 10 may determine the commutation timing according to the back-EMF signal Ewn. In addition, the control circuit 10 may determine the PWM duty cycle, and then transmit the switching signal SW to the switch control circuit 202 according to the PWM ON/OFF states.

During the PWM OFF time of the back-EMF signal Ewn, the voltage at the second terminal of the second resistor R2 may be set to a high enough voltage (e.g., the control voltage VCC) to forward-bias the bypass diode Db, and the back-EMF signal Ewn may be expressed by Equation (3):

$$Ewn = 1.5\,ew + VD \qquad \text{Equation (3)}$$

During the PWM ON time of the back-EMF signal Ewn, the voltage at the second terminal of the second resistor R2 may be set to a low enough voltage (e.g., the ground voltage GND) to reverse-bias the bypass diode Db, and the back-EMF signal Ewn may be expressed by Equation (4):

$$Ewn = (0.5\,VDC + 1.5\,ew)*R2/(R1+R2) \qquad \text{Equation (4)}$$

The control circuit 10 may enable the second terminal of the second resistor R2 to receive the control voltage VCC or the ground voltage GND according to the PWM ON/OFF states. Specifically, the control circuit 10 may transmit information of the PWM ON/OFF states to the switch control circuit 202, and the switch control circuit 202 may determine the state of the switching signal Ssw according to the information of the PWM ON/OFF states. The information of the PWM ON/OFF states may include the PWM ON time or the PWM OFF time of the driving signal of the first set of switches 121. In some embodiments, the switch control circuit 202 may set the switching signal Ssw to logic HIGH during the PWM ON time of the back-EMF signal Ewn to couple the first terminal of the switch SW to the ground terminal 19, and set the switching signal Ssw to logic LOW during PWM OFF time of the back-EMF signal Ewn to couple the first terminal of the switch SW to receive the control voltage VCC, as shown in the operation method 200 of FIG. 2. The circuit configuration and operation of the voltage divider circuits 16-1 and 16-2 may be similar to the voltage divider circuit 16, and the explanation therefor may be found in the preceding paragraphs and will not be repeated here.

Figure 2:
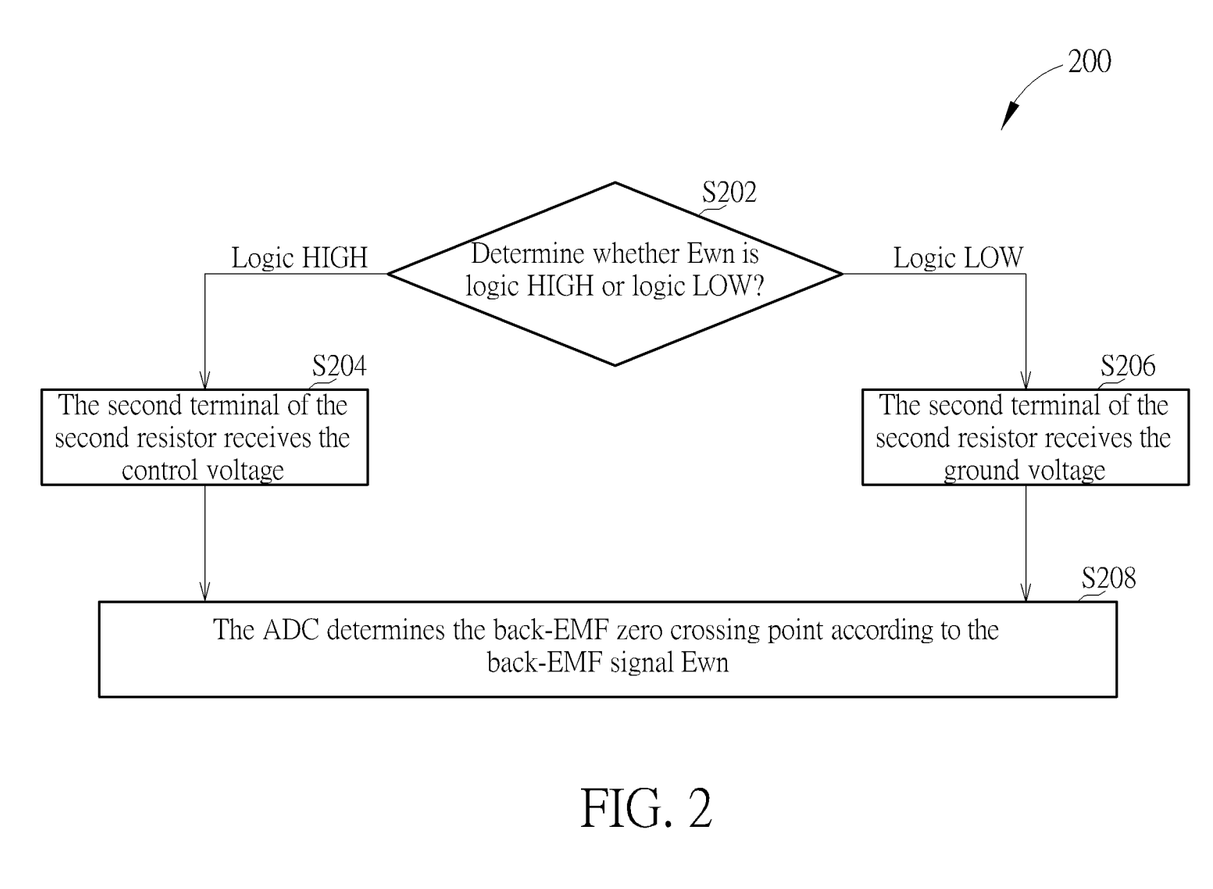
FIG. 2 is a flowchart of an operation method of operating the motor system in FIG. 1.

FIG. 2 is a flowchart of an operation method 200 of operating the motor system 1. The operation method 200 includes Steps S202 to S208, wherein Steps S202 to S206 are used to configure the voltage at the second terminal of the second resistor R2 according to the pulse width modulation driving signal, and Step S208 is used to determine the back-EMF zero crossing point. Any reasonable step change or adjustment is within the scope of the present disclosure. Steps S202 to S208 are detailed as follows:

Step S202: The ADC 18 receives the back-EMF signal Ewn from the second terminal of the first resistor R1, and the control circuit 10 determines whether the back-EMF signal Ewn is logic HIGH or logic LOW based on the PWM states of the three sets of switches of the switch circuit 12; If the back-EMF signal Ewn is logic HIGH, proceed to Step S206; if the back-EMF signal Ewn is logic LOW, proceed to Step S204;

Step S204: The second terminal of the second resistor R2 receives the control voltage VCC;

Step S206: The second terminal of the second resistor R2 receives the ground voltage GND;

Step S208: The ADC 18 determines the back-EMF zero crossing point according to the back-EMF signal Ewn.

Figure 3:
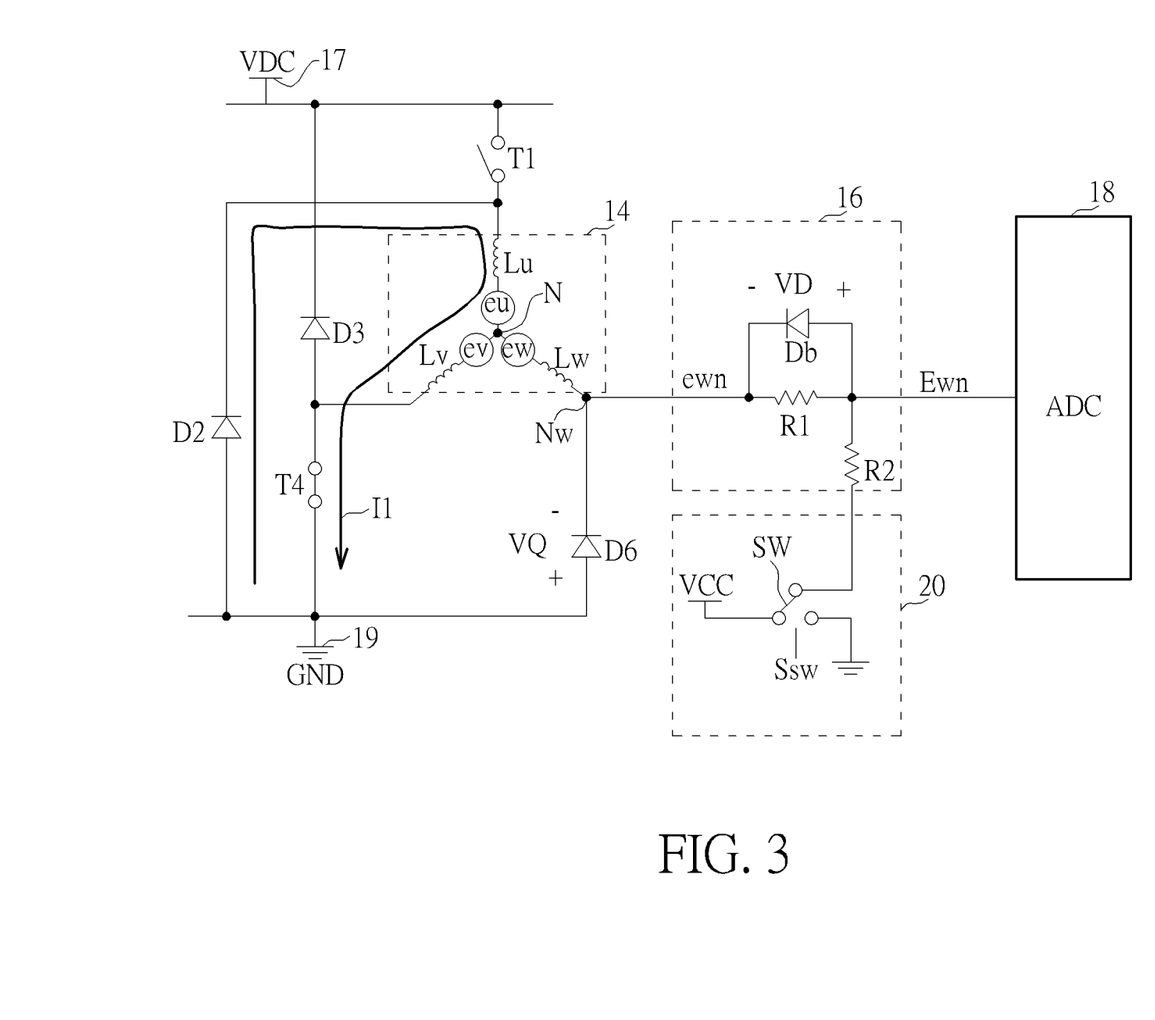
FIG. 3 shows a schematic diagram of the motor system in FIG. 1 for detecting the back-EMF zero crossing point when the PWM signal of first set of switches is at the PWM OFF state.
Figure 4:
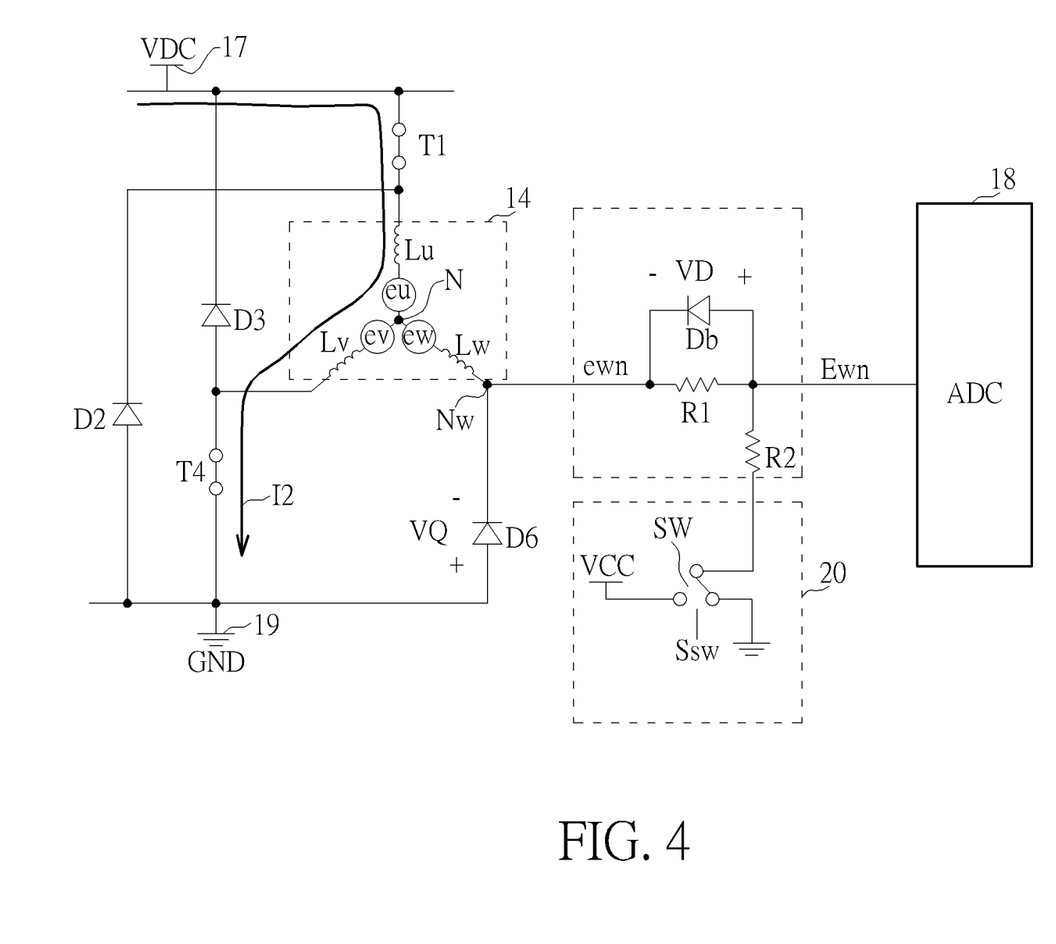
FIG. 4 shows a schematic diagram of the motor system in FIG. 1 for detecting the back-EMF zero crossing point when the PWM signal of first set of switches is at the PWM ON state.
Figure 5:
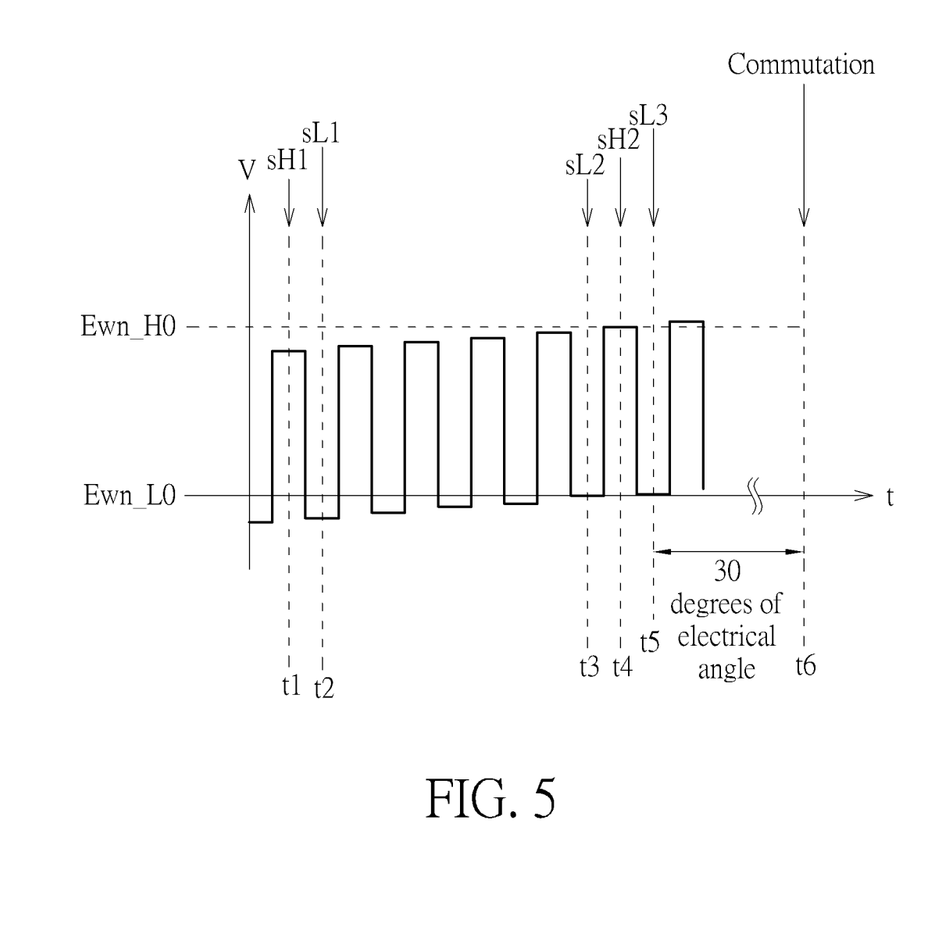
FIG. 5 shows the waveform diagram of the back-EMF signal of the motor system in FIG. 1.

The operation method 200 is explained below with reference to FIGS. 3 to 5. FIG. 5 shows the waveform diagram of the back-EMF signal of the motor system 1, where the horizontal axis represents time t, the vertical axis represents voltage V, and a reference level Ewn_H0 is the zero crossing point level in the PWM ON time, and a reference level Ewn_L0 is the zero crossing point level in the PWM OFF time. When the voltage of the back-EMF signal Ewn is equal to the reference level Ewn_H0 or Ewn_L0, the ADC 18 determines that the BEMF zero crossing point is detected. In some embodiments, the reference level Ewn_H0 may be equal to 0.5 VDC*R2/(R1+R2), and the reference level Ewn_L0 may be equal to the threshold voltage VD. FIG. 3 shows a schematic diagram of the motor system 1 for detecting the back-EMF zero crossing point when the PWM signal of the first set of switches 121 is logic LOW. FIG. 4 shows a schematic diagram of the motor system 1 for detecting the back-EMF zero crossing point when the PWM signal of the first set of switches 121 is logic HIGH.

Referring to FIG. 5, at Time t1, the switch circuit 20 determines that the back-EMF signal Ewn is logic HIGH (Step S202), and thus generates the switching signal Ssw to couple the first terminal of the switch SW to the ground terminal 19, so as to output the ground voltage GND to the second terminal of the second resistor R2 to form the circuit configuration in FIG. 4 (Step S206), thereby receiving the back-EMF signal Ewn from the second terminal of the first resistor R1 to obtain a HIGH-state sample sH1, and determining the back-EMF zero crossing point according to the HIGH-state sample sH1 (Step S208). Referring to FIG. 4, the high-side switch T1 and the low-side switch T4 are turned on, and the current I2 flows from the supply terminal 17 through the windings Lu and Lv to the ground terminal 19, setting the back-EMF signal Ew to logic HIGH. When the second terminal of the second resistor R2 receives the ground voltage GND, the first resistor R1 and the second resistor R2 form a voltage divider, setting the bypass diode Db to be reverse biased and in the OFF state, generating a divided voltage of voltage ewn as the back-EMF signal Ewn. In FIG. 5, since the HIGH-state sample sH1 is less than the reference level Ewn_H0, the ADC 18 determines that the back-EMF zero crossing point is not detected.

At Time t2, the switch circuit 20 determines that the back-EMF signal Ewn is logic LOW (Step S202), and thus generates the switching signal Ssw to couple the first terminal of the switch SW to the supply terminal 204, so as to output the control voltage VCC to the second terminal of the second resistor R2 to form the circuit configuration in FIG. 3 (Step S204), thereby receiving the back-EMF signal Ewn from the second terminal of the first resistor R1 to obtain a LOW-state sample sL1, and determining the back-EMF zero crossing point according to the LOW-state sample sL1 (Step S208). Referring to FIG. 3, the high-side switch T1 is turned off and the low-side switch T4 are turned on, and the current I1 flows from body diode D2 through the winding Lu and the winding Lv to the ground terminal 19, setting the back-EMF signal Ew to logic LOW. When the second terminal of the second resistor R2 receives the control voltage VCC, the bypass diode Db is forward biased and in the ON state, forming a bypass path for the resistor R1 via the bypass diode Db, bringing up the voltage level of the back-EMF signal Ewn without being divided by the resistor R1, preventing the back-EMF signal Ewn from being attenuated by the voltage divider circuit 16. In FIG. 5, since the LOW-state sample sL1 is less than the reference level Ewn_L0, the ADC 18 determines that the back-EMF zero crossing point is not detected.

At Time t3, the switch circuit 20 determines that the back-EMF signal Ewn is logic LOW (Step S202), and thus generates the switching signal Ssw to couple the first terminal of the switch SW to the supply terminal 204, so as to output the control voltage VCC to the second terminal of the second resistor R2 (Step S204), thereby receiving the back-EMF signal Ewn from the second terminal of the first resistor R1 to obtain a LOW-state sample sL2, and determining the back-EMF zero crossing point according to the LOW-state sample sL2 (Step S208). Since the LOW-state sample sL2 is equal to the reference level Ewn_L0, the ADC 18 determines that the back-EMF zero crossing point has been detected.

At Time t4, the switch circuit 20 determines that the back-EMF signal Ewn is logic HIGH (Step S202), and thus generates the switching signal Ssw to couple the first terminal of the switch SW to the ground terminal 19, so as to output the ground voltage GND to the second terminal of the second resistor R2 (Step S206), thereby receiving the back-EMF signal Ewn from the second terminal of the first resistor R1 to obtain a HIGH-state sample sH2, and determining the back-EMF zero crossing point according to the HIGH-state sample sH2 (Step S208). Since the HIGH-state sample sH2 is close to the reference level Ewn_H0, the ADC 18 determines and informs the control circuit 10 that the back-EMF zero crossing point has been detected.

At Time t5, the switch circuit 20 determines that the back-EMF signal Ewn is logic LOW (Step S202), and thus generates the switching signal Ssw to couple the first terminal of the switch SW to the supply terminal 204, so as to output the control voltage VCC to the second terminal of the second resistor R2 (Step S204), thereby receiving the back-EMF signal Ewn from the second terminal of the first resistor R1 to obtain a LOW-state sample sL3, and determining the back-EMF zero crossing point according to the LOW-state sample sL3 (Step S208). Since the LOW-state sample sL3 is greater than the reference level Ewn_H0, the ADC 18 determines and informs the control circuit 10 that the back-EMF zero crossing point has been detected.

Upon detecting the back-EMF zero crossing point, the control circuit 10 may delay for 30 degrees of electrical angle and then perform commutation.

While the embodiments in FIGS. 1 to 5 only show the detection of the back-EMF zero crossing point of the back-EMF ew, the present invention is not limited thereto. Those skilled in the art could apply the principle of the invention to detect the back-EMF zero crossing points of the back-EMFs eu and ev. In addition, while the embodiment discloses detecting the back-EMF zero crossing point according to HIGH-state samples and LOW-state samples of the back-EMF signal Ewn, the invention is not limited thereto. Those skilled in the art may also detect the back-EMF zero crossing point signal only according to the high level samples or the low level samples of the back-EMF signal Ewn. In some embodiments, when the duty cycle of the PWM signal exceeds 50%, the motor system 1 may only detect the back-EMF zero crossing point according to HIGH-state samples of the back-EMF signal Ewn; and when the duty cycle of the PWM signal is less than 50%, the motor system 1 may detect the back-EMF zero crossing point only according to the LOW-state samples of the back-EMF signal Ewn, thereby increasing the sampling accuracy. During each PWM ON time and PWM OFF time, the detection of the back-EMF zero crossing point is not limited to once.

The embodiments of FIGS. 1 to 5 employ the bypass diodes to prevent the back-EMF signal Ewn from being too small during the PWM OFF time owing to the attenuation of the voltage divider circuit 16, and to raise the DC level to enable the back-EMF signal Ewn to reflect the actual changes of the back-EMF ew in real time, thereby accurately detecting the back-EMF zero crossing point.

Figure 6:
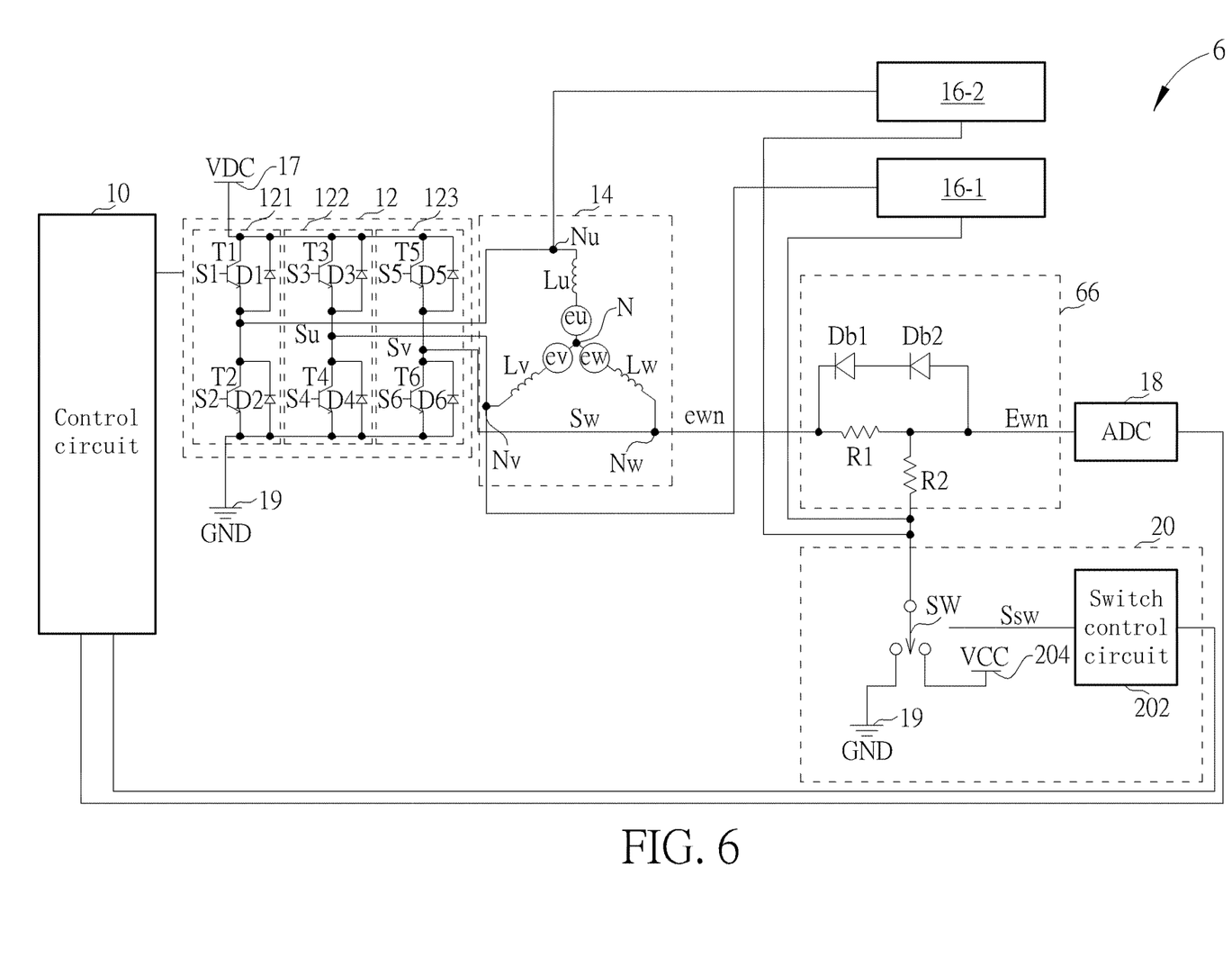
FIG. 6 is a schematic diagram of a motor system according to another embodiment of the invention.

FIG. 6 is a schematic diagram of a motor system 6 according to another embodiment of the invention. The difference between the motor system 6 and the motor system 1 lies in that the first bypass diode Db1 and the second bypass diode Db2 in the voltage divider circuit 66 are used to replace the bypass diode Db in the voltage divider circuit 16. The differences between the motor system 6 and the motor system 1 will be explained below, and the explanations of the other components in the motor system 6 can be found in the preceding paragraphs and will not be repeated here.

The first bypass diode Db1 includes a first terminal coupled to the first terminal of the resistor R1, and a second terminal. The second bypass diode Db2 includes a first terminal coupled to the second terminal of the first bypass diode Db1, and a second terminal coupled to the second terminal of the first resistor R1. The threshold voltage of the first bypass diode Db1 and the threshold voltage of the second bypass diode Db2 may be greater than, equal to, or less than the threshold voltage VQ of the body diode D6 of the low-side switch T6. The voltage between the second terminal of the second bypass diode Db2 and the first terminal of the first bypass diode Db1 may be greater than the threshold voltage VQ of the body diode D6 of the low-side switch T6. For example, the threshold voltage of the first bypass diode Db1 may be 0.6V, the threshold voltage of the second bypass diode Db2 may be 0.6V, and the voltage between the second terminal of the second bypass diode Db2 and the first terminals of the path diode Db1 may be 1.2V, and the threshold voltage VQ of the body diode D6 of the low-side switch T6 may be 0.7V.

Since the voltage between the second terminal of the second bypass diode Db2 and the first terminal of the first bypass diode Db1 is greater than the threshold voltage VQ of the body diode D6 of the low-side switch T6, the voltage divider circuit 66 may use the multiple bypass diodes with smaller threshold voltages to increase the voltage level of the back-EMF signal Ewn, so that the zero-crossing point of the back-EMF signal Ewn is greater than zero during the PWM OFF time.

This enables the back-EMF signal Ewn to reflect the true change of the back-EMF ew in real time for accurate detection of the back-EMF zero crossing point.

While the voltage divider circuit 66 only uses two stacked bypass diodes, those skilled in the art could apply the principle of the present invention to configure other numbers of stacked bypass diodes in the voltage divider circuit 66 to meet actual requirements.

Figure 7:
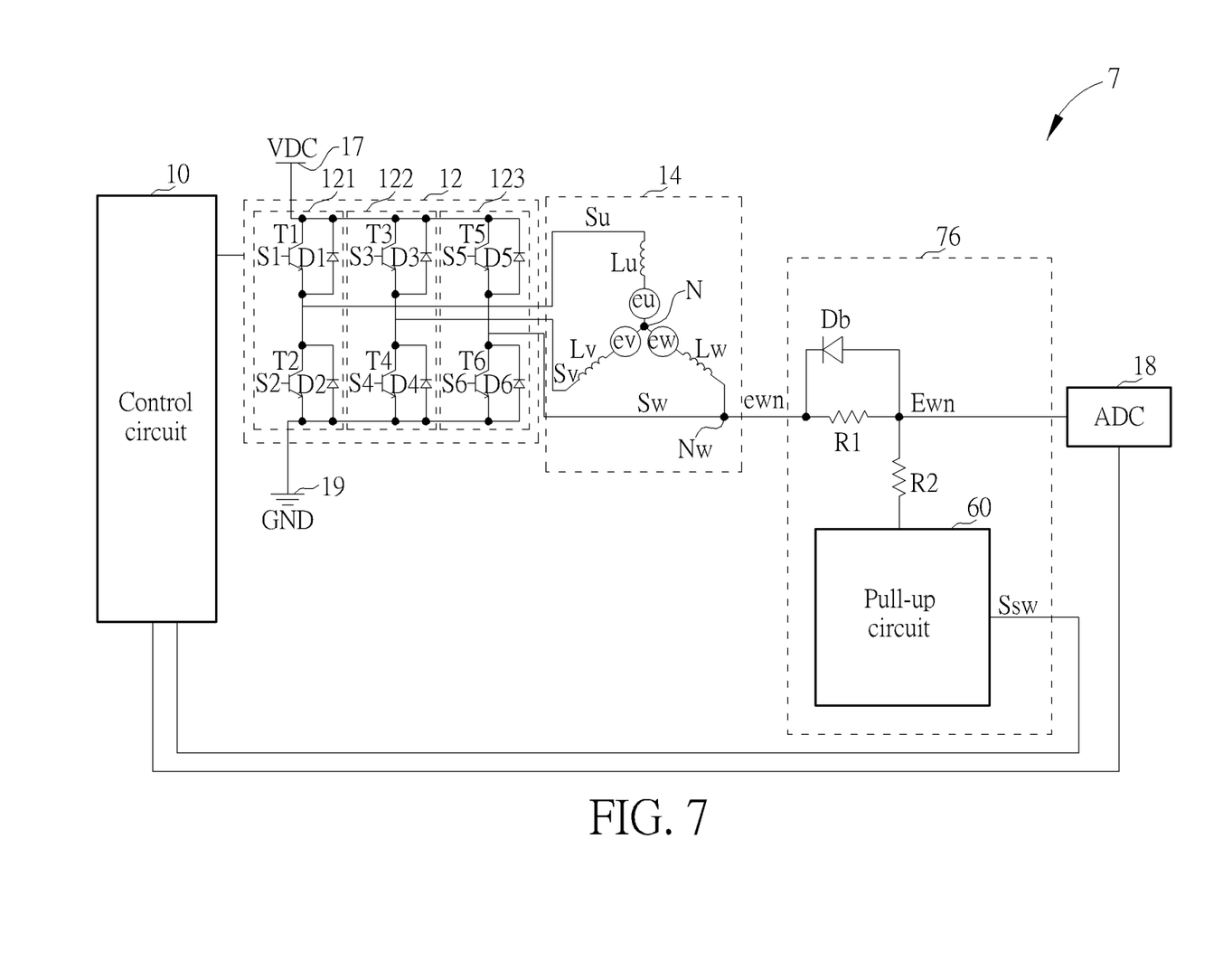
FIG. 7 is a schematic diagram of a motor system according to another embodiment of the invention.

FIG. 7 is a schematic diagram of a motor system 7 according to another embodiment of the invention. The motor system 7 and the motor system 1 are different in that the pull-up circuit 60 in the voltage divider circuit 76 is used to replace the switch SW in the voltage divider circuit 16. The differences between the motor system 7 and the motor system 1 will be explained below, and the explanations of the other components in the motor system 7 can be found in the preceding paragraphs and will not be repeated here.

The pull-up circuit 60 is connected to the control circuit 10 and the second terminal of the second resistor R2. The control circuit 10 is used to control the pull-up circuit 60 to output the control voltage VCC to the second terminal of the second resistor R2 when the back-EMF signal Ewn is logic LOW; and output the ground voltage GND to the second terminal of the second resistor R2 when the back-EMF signal Ewn is logic HIGH.

The pull-up circuit 60 may include a microprocessor or transistors. In some embodiments, the pull-up circuit 60 may include a microprocessor coupled to the second terminal of the second resistor R2 and the control circuit 10 to receive the switching signal Ssw to output the control voltage VCC or the ground voltage GND to the second terminal of the second resistor R2. The pull-up circuit 60 may be integrated with the control circuit 10 to form a single chip. In other embodiments, the pull-up circuit 60 may include a pull-up transistor and a pull-down transistor. The pull-down transistor includes a control terminal connected to the control circuit 10 to receive the switching signal Ssw; a first terminal coupled to the second terminal of the second resistor R2, and a second terminal coupled to the ground terminal 19. The pull-up transistor includes a control terminal coupled to the control circuit 10 to receive the switching signal Ssw; a first terminal coupled to the control voltage VCC; and a second terminal coupled to the second terminal of the second resistor R2. When the back-EMF signal Ewn is logic HIGH, the control circuit 10 may output logic LOW in the switching signal Ssw to enable the second terminal of the second resistor R2 to receive the ground voltage GND, and when the back-EMF signal Ewn is logic LOW, the control circuit 10 may output logic HIGH in the switching signal Ssw to enable the second terminal of the second resistor R2 to receive the control voltage VCC.

The voltage divider circuit 76 may use the bypass diode to raise the voltage level of the back-EMF signal Ewn during the PWM OFF time, so that the zero-crossing point of the back-EMF signal Ewn is greater than zero, enabling the back-EMF signal Ewn to reflect the true change of the back-EMF ew in real time for accurate detection of the back-EMF zero crossing point.

Figure 8:
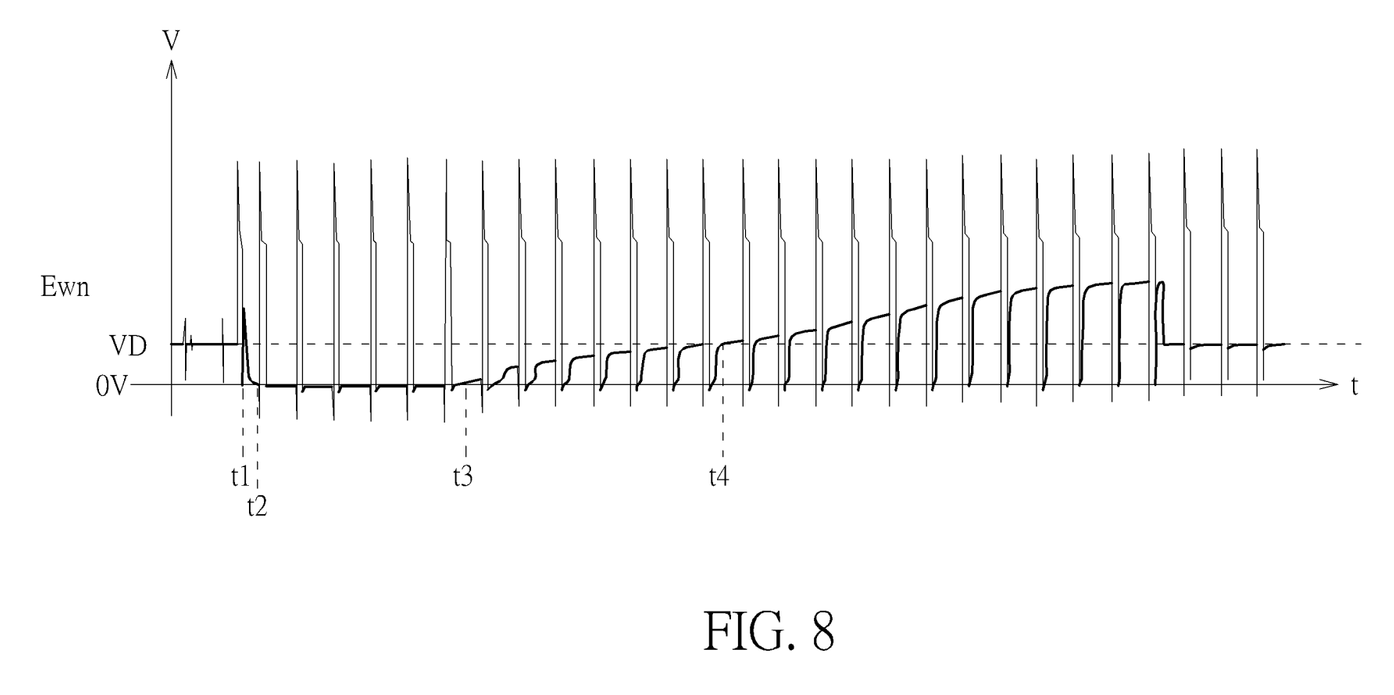
FIG. 8 shows the waveform diagram of the motor system in FIG. 1.

FIG. 8 shows a waveform diagram of the back-EMF signal Ewn of the motor system 1, where the horizontal axis represents time t and the vertical axis represents voltage. The back-EMF signal Ewn may include a PWM pulse and may oscillate between the voltage VDC and 0V. In some embodiments, the voltage VDC is equal to a supply voltage from an external source.

At Time t1, the motor system 1 commutates. During the PWM OFF time, the control circuit 10 outputs logic LOW in the switching signal Ssw to enable the second terminal of the second resistor R2 to receive the control voltage VCC, and the voltage in the back-EMF signal Ewn is higher than the threshold voltage VD owing to the freewheeling effect generated by the winding inductor current. The freewheeling effect may be eliminated by a logic program. At Time t2, the back-EMF signal Ewn drops to close to 0V, indicating that the winding has been discharged to 0V. Later, since the back EMF signal ewn is clamped by the diode D6, and the threshold voltage VQ is close to the threshold voltage VD, the back EMF signal ewn is maintained close to 0V during the PWM OFF time.

At Time t3, the low voltage of the back-EMF signal Ewn increases and the D6 diode is turned off, the back-EMF signal Ewn may receive the unattenuated back-EMF signal ewn. Between Time t3 and Time t4, the low voltage of the back-EMF signal Ewn gradually rises from 0V. At Time t4, the low voltage of the back-EMF signal Ewn reaches the threshold voltage VD, and thus the motor system 1 detects the back-EMF zero crossing point.

The motor system and operation method in the embodiments of the present invention are used to adjust the voltage level of the back-EMF signal during the PWM OFF time, and use the bypass diode to achieve the purpose of not attenuating the signal and pulling up the voltage level, so as to detect the change of the back-EMF signal ewn below zero voltage, so that the back-EMF signal Ewn may reflect the true change of back-EMF ew in real-time, so as to accurately detect the zero crossing point of back-EMF.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A motor system comprising:
    a brushless direct current (BLDC) motor comprising a first winding, a second winding and a third winding, the first winding, the second winding and the third winding being coupled to each other at a neutral node;
    a driving circuit comprising:
        a first set of switches coupled to the first winding, and configured to output a pulse width modulation driving signal to the first winding;
        a second set of switches coupled to the second winding, and configured to couple the second winding to a ground terminal; and
        a third set of switches coupled to the third winding, and configured to float the third winding;
    a voltage divider circuit comprising:
        a first resistor comprising a first terminal coupled to the third winding, and a second terminal;
        a second resistor comprising a first terminal coupled to the second terminal of the first resistor, and a second terminal configured to optionally receive a control voltage or a ground voltage; and
        a bypass diode comprising a first terminal coupled to the first terminal of the first resistor, and a second terminal coupled to the second terminal of the first resistor; and
    an analog-to-digital converter (ADC) coupled to the voltage divider circuit and configured to receive a back electromotive force (back-EMF) signal from the second terminal of the first resistor to enable the second terminal of the second resistor to receive the control voltage or the ground voltage according to the back-EMF signal, and determine a back-EMF zero crossing point according to the back-EMF signal.

2. The motor system of claim 1, further comprises a switch circuit coupled to the voltage divider circuit, the switch circuit comprising:
    a switch control circuit; and
    a switch comprising:
        a control terminal coupled to the switch control circuit;
        a first terminal optionally coupled to a supply terminal or the ground terminal; and
        a second terminal coupled to the second terminal of the second resistor.

3. The motor system of claim 2, wherein the motor system further comprises:
    a control circuit coupled to the ADC and the switch control circuit, and configured to couple the first terminal of the switch to the supply terminal when the back-EMF signal is logic LOW, so as to output the control voltage to the second terminal of the second resistor.

4. The motor system of claim 2, wherein the motor system further comprises:
    a control circuit coupled to the ADC and the switch control circuit, and configured to couple the first terminal of the switch to the ground terminal when the back-EMF signal is logic HIGH, so as to output the ground voltage to the second terminal of the second resistor.

5. The motor system of claim 1, wherein the voltage divider circuit further comprises a pull-up circuit coupled to the ADC and the second terminal of the second resistor.

6. The motor system of claim 5, wherein the ADC is configured to control the pull-up circuit to output the control voltage to the second terminal of the second resistor when the back-EMF signal is logic LOW.

7. The motor system of claim 5, wherein the ADC is configured to control the pull-up circuit to output the ground voltage to the second terminal of the second resistor when the back-EMF signal is logic HIGH.

8. The motor device of claim 1, wherein:
    a threshold voltage of the bypass diode is greater than a threshold voltage of a body diode of a low-side switch of the third set of switches;
    the first terminal of the bypass diode is a cathode; and
    the second terminal of the bypass diode is an anode.

9. The motor system of claim 1, wherein the voltage divider circuit further comprises:
    a second bypass diode comprising a first terminal coupled to the second terminal of the bypass diode, and a second terminal coupled to the second terminal of the first resistor, wherein a voltage between the second terminal of the second bypass diode and the first terminal of the bypass diode is greater than a threshold voltage of a body diode of a low-side switch of the third set of switches.

10. A method of operating a motor system, the motor system comprising a brushless direct current (BLDC) motor, a voltage divider circuit, a switch and an analog-to-digital converter (ADC), the BLDC motor comprising a first winding, a second winding and a third winding, the first winding, the second winding and the third winding being coupled to each other at a neutral node, the driving circuit comprising a first set of switches coupled to the first winding and configured to output a pulse width modulation driving signal to the first winding, a second set of switches coupled to the second winding and configured to couple the second winding to a ground terminal, and a third set of switches coupled to the third winding and configured to float the third winding, the voltage divider circuit comprising a first resistor, a second resistor and a bypass diode, the first resistor comprising a first terminal coupled to the third winding and a second terminal, and a second terminal, the second resistor comprising a first terminal coupled to the second terminal of the first resistor, and a second terminal configured to optionally receive a control voltage or a ground voltage, the bypass diode comprising a first terminal coupled to the first terminal of the first resistor, and a second terminal coupled to the second terminal of the first resistor, the ADC being coupled to the voltage divider circuit, the method comprising:
    the ADC receiving a back-EMF signal from the second terminal of the first resistor;
    the ADC enabling the second terminal of the second resistor to receive the control voltage or the ground voltage according to the back-EMF signal; and
    the ADC determines a back-EMF zero crossing point according to the back-EMF signal.

11. The method of claim 10, wherein:
    the motor system further comprises a switch circuit coupled to the voltage divider circuit, the switch circuit comprising a switch control circuit and a switch, the switch comprising a control terminal coupled to the switch control circuit, a first terminal, and a second terminal coupled to the second terminal of the second resistor; and the method the ADC enabling the second terminal of the second resistor to receive the control voltage or the ground voltage according to the back-EMF signal comprises:

the switch control circuit controlling the switch to optionally couple the first terminal of the switch to a supply terminal or the ground terminal.

12. The method of claim 11, wherein:
the motor system further comprises a control circuit coupled to the ADC and the switch control circuit; and
the switch control circuit controlling the switch to optionally couple the first terminal of the switch to the supply terminal or the ground terminal comprises:
the control circuit transmitting information of a PWM duty cycle to the switch control circuit; and
the switch control circuit coupling the first terminal of the switch to the supply terminal if the information of the PWM duty cycle indicates that the back-EMF signal is logic LOW, so as to output the control voltage to the second terminal of the second resistor.

13. The method of claim 11, wherein:
the motor system further comprises a control circuit coupled to the ADC and the switch control circuit; and
the switch control circuit controlling the switch to optionally couple the first terminal of the switch to the supply terminal or the ground terminal comprises:
the control circuit transmitting information of a PWM duty cycle to the switch control circuit; and
the switch control circuit coupling the first terminal of the switch to the ground terminal if the information of the PWM duty cycle indicates that the back-EMF signal is logic HIGH, so as to output the ground voltage to the second terminal of the second resistor.

14. The method of claim 10, wherein:
the voltage divider circuit further comprises a pull-up circuit coupled to the ADC and the second terminal of the second resistor; and
the method the ADC enabling the second terminal of the second resistor to receive the control voltage or the ground voltage according to the back-EMF signal comprises:
the ADC controlling the pull-up circuit to output the control voltage to the second terminal of the second resistor when the back-EMF signal is logic LOW.

15. The method of claim 10, wherein:
the voltage divider circuit further comprises a pull-up circuit coupled to the ADC and the second terminal of the second resistor; and
the method the ADC enabling the second terminal of the second resistor to receive the control voltage or the ground voltage according to the back-EMF signal comprises:
the ADC controlling the pull-up circuit to output the ground voltage to the second terminal of the second resistor when the back-EMF signal is logic HIGH.

16. The method of claim 10, wherein a threshold voltage of the bypass diode is greater than a threshold voltage of a body diode of a low-side switch of the third set of switches.

* * * * *